United States Patent
Takasumi

(10) Patent No.: US 9,565,411 B2
(45) Date of Patent: Feb. 7, 2017

(54) IMAGE PROCESSING DEVICE, IMAGE PROCESSING METHOD, AND NON-TRANSITORY COMPUTER-READABLE RECORDING MEDIUM FOR RECORDING IMAGE PROCESSING PROGRAM

(71) Applicant: Olympus Corporation, Hachioji-shi, Tokyo (JP)

(72) Inventor: Shinya Takasumi, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/617,281

(22) Filed: Feb. 9, 2015

(65) Prior Publication Data

US 2015/0304619 A1 Oct. 22, 2015

(30) Foreign Application Priority Data

Apr. 17, 2014 (JP) ................................. 2014-085820

(51) Int. Cl.
*H04N 5/225* (2006.01)
*H04N 9/73* (2006.01)

(52) U.S. Cl.
CPC ..................... *H04N 9/735* (2013.01)

(58) Field of Classification Search
CPC ......... H04N 9/3182; H04N 9/73; H04N 9/735
See application file for complete search history.

(56) References Cited

U.S. PATENT DOCUMENTS

| | | | | |
|---|---|---|---|---|
| 2003/0058350 A1* | 3/2003 | Ishimaru | ............... | H04N 9/735 348/223.1 |
| 2007/0201738 A1* | 8/2007 | Toda | ..................... | H04N 9/045 382/144 |
| 2008/0094485 A1* | 4/2008 | Huang | .................. | H04N 9/735 348/223.1 |
| 2012/0086830 A1* | 4/2012 | Ichikawa | .............. | H04N 9/735 348/223.1 |
| 2013/0188074 A1* | 7/2013 | Nakabayashi | ........ | H04N 5/238 348/223.1 |

FOREIGN PATENT DOCUMENTS

| JP | 2000-004381 | 1/2000 |
|---|---|---|
| JP | 2013-223061 | 10/2013 |

* cited by examiner

*Primary Examiner* — Twyler Haskins
*Assistant Examiner* — Dwight C Tejano
(74) *Attorney, Agent, or Firm* — John C. Pokotylo; Straub & Pokotylo

(57) ABSTRACT

An image processing device provided with: a white balance correcting section multiplying image data by a white balance gain for each color component; a color difference calculating section calculating color difference components of the image data after the white balance correction, for each pixel; and a color difference correcting section setting a color difference correction range wider as the white balance gain is larger, and, when all the color difference components of a processing target pixel are within the set color difference correction range, performing color difference correction processing for reducing the color difference components of the processing target pixel.

9 Claims, 15 Drawing Sheets

IMAGE PROCESSING DEVICE, IMAGE PROCESSING METHOD, AND NON-TRANSITORY COMPUTER-READABLE RECORDING MEDIUM FOR RECORDING IMAGE PROCESSING PROGRAM

CROSS REFERENCE TO RELATED APPLICATION

This application claims benefit of Japanese Application No. 2014-85820 filed in Japan on Apr. 17, 2014, the entire contents of which are incorporated herein by this reference.

BACKGROUND OF THE INVENTION

1. Field of the Invention

The present invention relates to an image processing device which performs white balance correction and color difference correction, an image processing method, and a non-transitory computer-readable recording medium for recording an image processing program.

2. Description of the Related Art

While a signal value of an analog signal can continuously change, a digital signal can change only by a predetermined quantization unit. Therefore, when an amount of change from an original signal value occurs, for example, in a luminance signal, a false contour may appear.

As a technique for reducing such a false contour, for example, Japanese Patent No. 4301627 describes a false contour correction technique in which a change corresponding to twice a minimum quantization unit of a video signal is detected as a bit loss part and is corrected to a change in the minimum quantization unit.

On the other hand, white balance processing for a color image has been conventionally performed as one of image processes. The white balance processing is processing for adjusting color balance so that a white part looks white by multiplying each color component by a different gain.

More specifically, in the white balance processing, for example, processing is performed in which some color components are multiplied by a white balance gain more than 1, and other color components are not multiplied by a white balance gain (or white balance gain by which the component is multiplied is 1).

However, when such white balance processing is performed, tone precision after the processing differs among color components, and a false color (a false color contour), which is color noise, may appear in gradation.

As a technique for reducing such a false color, for example, Japanese Patent Application Laid-Open Publication No. 2013-223061 describes a color noise reduction technique in which color difference data of image data for which each color component is multiplied by a white balance gain is calculated, and the color difference data within a color difference range where color noise in achromatic color gradation is conspicuous is reduced According to the technique described in Japanese Patent Application Laid-Open Publication No. 2013-223061, an effect of reducing coloring in achromatic color gradation can be expected, and an effect of deterioration of tone precision due to the white balance gain being improved can be also expected.

Some of recent digital cameras are provided with an image pickup driving mode capable of reading image pickup data at a high speed, and the digital cameras are used in a case of performing high-speed consecutive shooting or performing live view display at a high-speed frame rate enabling smooth motions. Such high-speed reading is achieved by reading low-bit image pickup data (that is, image pickup data with low bit precision).

SUMMARY OF THE INVENTION

An image processing device according to an aspect of the present invention includes: a white balance correcting section multiplying each color component of image data by a white balance gain for the color component to perform white balance correction; a color difference calculating section calculating color difference components of the image data after the white balance correction, for each pixel; a color difference correcting section performing color difference correction processing for reducing the color difference components for a processing target pixel when all the color difference components of the processing target pixel are within a predetermined color difference correction range; and a color difference correction range setting section setting the color difference correction range wider as the white balance gain is larger and narrower as the white balance gain is smaller.

An image processing method according to an aspect of the present invention includes: a white balance correcting step of multiplying each color component of image data by a white balance gain for the color component to perform white balance correction; a color difference calculating step of calculating color difference components of the image data after the white balance correction, for each pixel; a color difference correction step of performing color difference correction processing for reducing the color difference components for a processing target pixel when all the color difference components of the processing target pixel are within a predetermined color difference correction range; and a color difference correction range setting step of setting the color difference correction range wider as the white balance gain is larger and narrower as the white balance gain is smaller.

A non-transitory computer-readable recording medium for recording an image processing program according to an aspect of the present invention includes an image processing program including: a white balance correcting step of multiplying each color component of image data by a white balance gain for the color component to perform white balance correction; a color difference calculating step of calculating color difference components of the image data after the white balance correction, for each pixel; a color difference correction step of performing color difference correction processing for reducing the color difference components for a processing target pixel when all the color difference components of the processing target pixel are within a predetermined color difference correction range; and a color difference correction range setting step of setting the color difference correction range wider as the white balance gain is larger and narrower as the white balance gain is smaller.

DETAILED DESCRIPTION OF THE PREFERRED EMBODIMENTS

Embodiments of the present invention will be described below with reference to drawings.

First Embodiment

Figure 1:
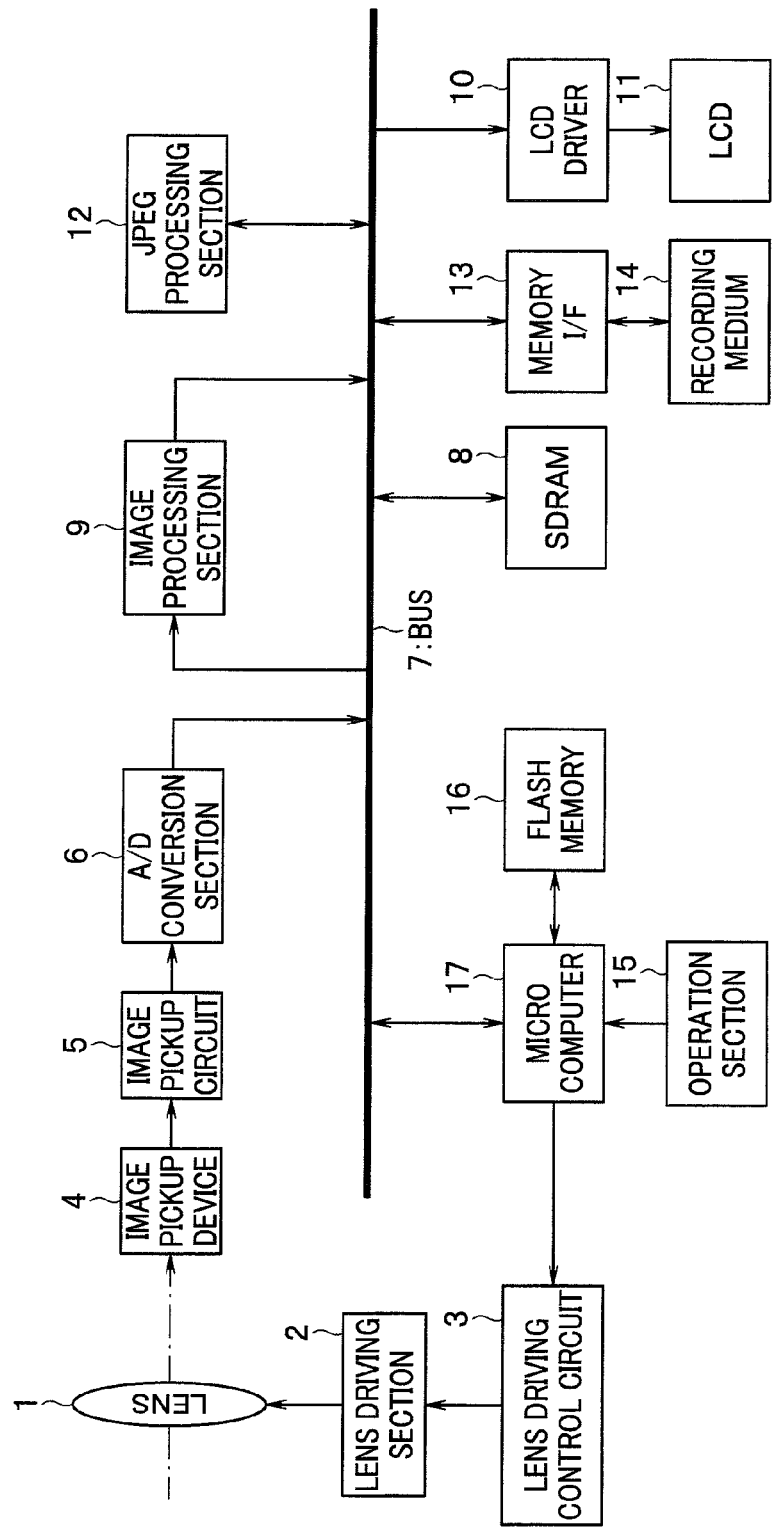
FIG. 1 is a block diagram showing a configuration of an image pickup apparatus provided with an image processing device in a first embodiment of the present invention.

FIGS. 1 to 22 show a first embodiment of the present invention, and FIG. 1 is a block diagram showing a configuration of an image pickup apparatus provided with an image processing device.

The present embodiment is such that an image processing device is applied to an image pickup apparatus provided with an image pickup function, and a specific example of the image pickup apparatus is a digital camera.

As shown in FIG. 1, the image pickup apparatus is provided with a lens 1, a lens driving section 2, a lens driving control circuit 3, an image pickup device 4, an image pickup circuit 5, an analog/digital (A/D) converting section 6, a bus 7, an SDRAM 8, an image processing section 9, an LCD driver 10, an LCD 11, a JPEG processing section 12, a memory interface (I/F) 13, a recording medium 14, an operation section 15, a flash memory 16 and a microcomputer 17.

The lens 1 is an optical system for forming an optical image of an object on the image pickup device 4. The lens 1 may be configured with a plurality of lenses such as a focus lens and a zoom lens.

The lens driving section 2 drives the lens 1 to perform focus adjustment, or, in a case of an electric zoom lens, further performs zoom adjustment and the like.

The lens driving control circuit 3 controls the lens driving section 2 to operate, in accordance with an instruction of the microcomputer 17.

The image pickup device 4 has a plurality of pixels arranged on an image pickup surface and performs photoelectric conversion of an optical image of an object formed by the lens 1 to output an image signal. It is assumed that the image pickup device 4 is a color image pickup device which outputs an image signal having a plurality of color components but is not limited to a particular configuration such as a CCD, a CMOS, a single-plate type and a three-plate type. It is assumed that the image pickup device 4 of the present embodiment can operate in a normal reading mode and a high-speed reading mode for performing reading at a higher frame rate than the normal reading mode.

The image pickup circuit 5 performs analog processing, such as CDS (correlated double sampling) processing and AGC (automatic gain control) processing, for an image signal outputted from the image pickup device 4.

The A/D converting section 6 converts the image signal processed by the image pickup circuit 5 to a digital signal (hereinafter referred to as image data). Here, it is assumed that bit precision of the image data outputted from the A/D converting section 6 is lower in the high-speed reading mode than in the normal reading mode. As a specific example, the image signal is converted to a 10-bit digital signal in the normal reading mode but is converted to a 8-bit digital signal in the high-speed reading mode.

The bus 7 is a transfer path for transferring various kinds of data, instructions and the like from a certain place to another place in the image pickup apparatus. The image data outputted from the A/D converting section 6 is transferred to the SDRAM 8 via the bus 7.

The SDRAM 8 is a storage section for temporarily storing various kinds of data which occur inside the image pickup apparatus including image data. The SDRAM 8 is also used as a buffer memory at a time of the image processing section 9 performing image processing.

The image processing section 9 as an example of the image processing device in the present embodiment performs various kinds of image processing as described later for inputted image data.

The LCD driver 10 converts the image data processed by the image processing section 9 or image data read from the recording medium 14 and expanded by the JPEG processing section 12 and the like to a video signal and outputs the video signal to the LCD 11.

The LCD 11 is a display device which displays an image by the video signal inputted from the LCD driver 10. Note that, though a liquid crystal display (LCD) is given as an example of the display device, other display devices such as an organic electroluminescence (an organic EL) may, of course, be used.

The JPEG processing section 12 compresses the image data processed by the image processing section 9 at a time of recording an image and expands the compressed image data at a time of reproducing the image. Here, as a compression/expansion system, for example, JPEG or TIFF is used for a still image, and, for example, MPEG or H.264 is used for a movie.

The memory I/F 13 is an interface for the microcomputer 17 or the like to access the recording medium 14 to perform writing to the recording medium 14 or reading from the recording medium 14.

The recording medium 14 nonvolatilely records an image file or the like created by adding header information to the image data compressed by the JPEG processing section 12. The recording medium 14 is configured, for example, as a memory card attachable to and detachable from the image pickup apparatus. Therefore, the recording medium 14 does not have to be a component specific to the image pickup apparatus.

The operation section 15 is for performing various kinds of operation inputs to the image pickup apparatus. The operation section 15 includes, for example, a power source button for turning on/off a power source of the image pickup apparatus, a mode setting button for setting a still image shooting mode, a movie shooting mode, a reproduction mode, a white balance mode and the like, a release button for inputting an instruction to start shooting, and the like.

Here, in the white balance mode, an auto white balance mode for automatically performing white balance correction according to a shot image can be set, and, additionally, manual setting for a user to select a kind of a light source from among daytime sunlight, evening sunlight, light bulb, fluorescent and the like is also possible.

When the still image shooting mode or the movie shooting mode has been set by the mode setting button, it is further possible to perform an operation of selecting the normal reading mode or the high-speed reading mode.

Note that, though the operation buttons are given as an example of the operation section 15 here, similar functions may be achieved by a touch panel, or other configurations may be adopted.

The flash memory 16 is a non-transitory computer-readable recording medium which nonvolatilely stores a processing program to be executed by the microcomputer 17 (for example, an image processing program for performing processes shown in FIGS. 3 to 6 to be described later) and various kinds of parameters required for operation of the image pickup apparatus. Here, as some examples of the parameters stored in the flash memory 16, thresholds showing a color difference range or a luminance value range for judging whether color noise reduction processing is necessary or not, basic characteristics data of a color difference reduction coefficient K to be used for the color noise reduction processing (see FIGS. 16 and 17), a white balance gain for white balance correction, a color matrix coefficient for color matrix calculation, a gamma table for gamma conversion and the like are given.

The microcomputer 17 is a control section which generally controls each of the sections in the image pickup apparatus as described above.

Figure 2:
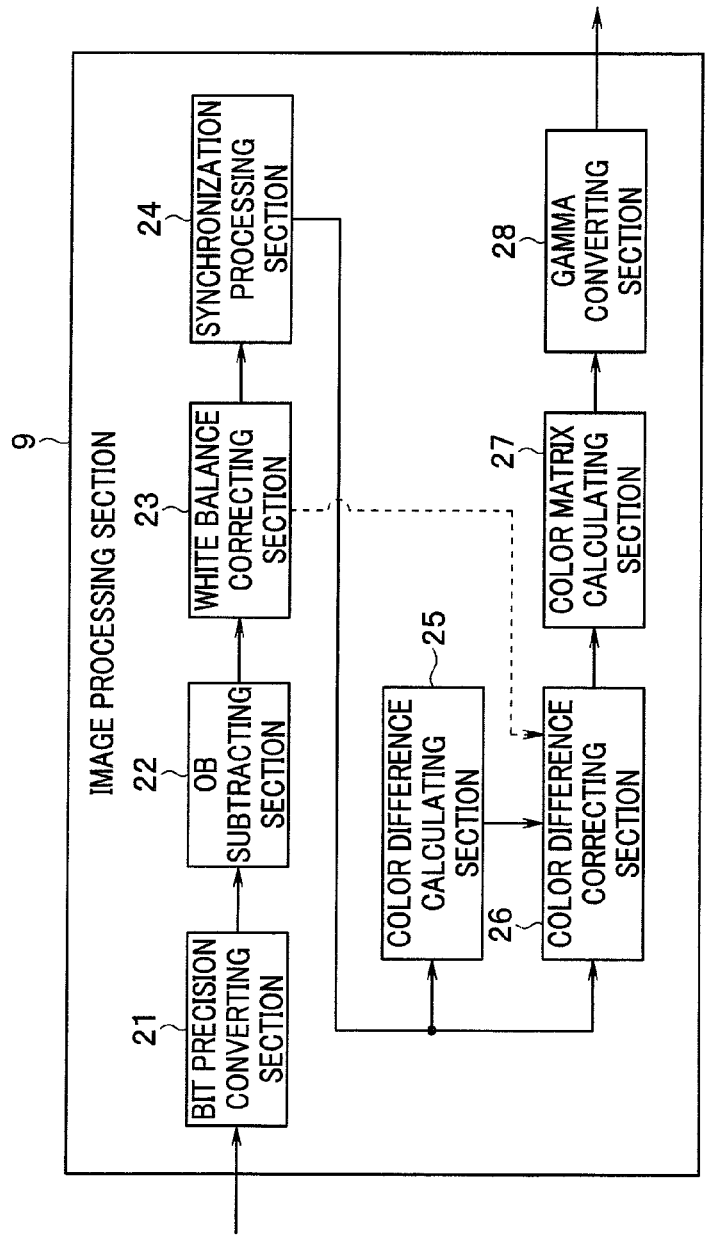
FIG. 2 is a block diagram showing a configuration of an image processing section in the above first embodiment.

Next, FIG. 2 is a block diagram showing a configuration of the image processing section 9.

The image processing section 9 has a bit precision converting section 21, an optical black (OB) subtracting section 22, a white balance correcting section 23, a synchronization processing section 24, a color difference calculating section 25, a color difference correcting section 26, a color matrix calculating section 27 and a gamma converting section 28.

The bit precision converting section 21 converts bit precision of inputted image data to bits-to-be-processed precision of the color difference correcting section 26 at a stage preceding the color difference correcting section 26. The image processing section 9 is designed, for example, so that bit precision of image data to be a processing target corresponds to bit precision at a time of the normal reading mode. Therefore, in this case, the bits-to-be-processed precision of the color difference correcting section 26 also corresponds to the bit precision at the time of the normal reading mode. In comparison, bit precision of image data outputted from the A/D converting section 6 at a time of the high-speed reading mode is different from the bit precision at the time of the normal reading mode as described above, that is, different from the bits-to-be-processed precision. Thus, the bit precision converting section 21 performs bit precision conversion so that bit precision of image data inputted to the image processing section 9 corresponds to the bits-to-be-processed precision when the bit precision of the image data is different from the bits-to-be-processed precision.

The OB subtracting section 22 performs OB subtraction processing for subtracting an optical black component from image data to reduce a dark current component.

The white balance correcting section 23 performs white balance correction processing by multiplying each color component of inputted image data by a white balance gain for the color component. Here, in the auto white balance mode, a white balance gain used by the white balance correcting section 23 is calculated on a basis of the acquired image data. If the user has selected the kind of the light source from among daytime sunlight, evening sunlight, light bulb, fluorescent and the like, a white balance gain determined in advance according to the selected kind of the light source is used. Then, the white balance gain for each color component used by the white balance correcting section 23 is outputted to the color difference correcting section 26 as shown by a broken-line arrow in FIG. 2.

When the image pickup device 4 is, for example, a single-plate type image pickup device, and only one color component can be obtained for one pixel, the synchronization processing section 24 performs interpolation processing so that all color components constituting a color image are included in one pixel. More specifically, if the image pickup device 4 is a single-plate type image pickup device provided with a color filter of a primary color Bayer array, synchronization processing is performed so that a red (R) component, a green (G) component and a blue (B) component are included in all the pixels.

The color difference calculating section 25 calculates color difference components of image data for which the white balance correction processing and the synchronization processing have been performed, for each pixel.

When all the color difference components of a processing target pixel are within a predetermined color difference correction range, the color difference correcting section 26 performs color difference correction processing for reducing the color difference components, for the pixel to be processed. The color difference correcting section 26 is further provided with a function as a color difference correction range setting section which sets, on a basis of a white balance gain inputted from the white balance correcting section 23, the color difference correction range so that the color difference correction range is wider as the white balance gain is larger and is narrower as the white balance gain is smaller.

The color difference calculating section 25 and the color difference correcting section 26 constitute a color noise reduction processing section which performs color noise reduction processing for reducing color noise such as a color contour which occurs in a part in achromatic color (hereinafter, an achromatic color including white and gray will be referred to as white or the like for convenience) of inputted image data.

The color matrix calculating section 27 performs color matrix calculation processing for performing color matrix calculation corresponding to a result of white balance correction, for image data to perform mapping of the image data on a particular color space.

The gamma converting section 28 performs gamma conversion processing for converting tone characteristics of inputted image data, for example, according to characteristics of the display device.

Among the respective sections in the image processing section 9 which perform processing of image data for which bit precision conversion has been performed by the bit precision converting section 21, the OB subtracting section 22, the white balance correcting section 23, the synchronization processing section 24 and the color matrix calculating section 27 are linear processing sections for performing linear processing, and the gamma converting section 28 is a nonlinear processing section for performing nonlinear processing. That is, the color difference calculating section 25 and the color difference correcting section 26 constituting the color noise reduction processing section are arranged at a stage prior to the nonlinear processing section. As described later, a color difference correction range targeted by the color difference correction processing by the color difference correcting section 26 changes according to a ratio between an input signal and an output signal (a signal increase/decrease ratio), and the increase/decrease ratio is complicated in the nonlinear processing (for example, when gamma conversion is given as an example, the increase/decrease ratio differs according to a luminance value of a signal). Therefore, it is preferable that the color noise reduction processing performed by the color difference correcting section 26 is performed at a stage prior to any nonlinear image processing performed for image data so as to cause the color difference correction range to change according to the signal increase/decrease ratio.

Next, an outline of a live view display operation and a shooting operation in the image pickup apparatus will be described.

When the power source of the image pickup apparatus is turned on, the microcomputer 17 sequentially reads program codes from the flash memory 16 and starts a process.

When live view display is started, the microcomputer 17 causes the image pickup device 4 to perform exposure for a predetermined exposure time period and output an image signal. Analog processing is performed for the outputted image signal by the image pickup circuit 5, and the image signal is converted to a digital signal by the A/D converting section 6 and stored into the SDRAM 8 through the bus 7. Image processing is performed by the image processing section 9 for the image data stored into the SDRAM 8 as a result of the exposure operation and stored into the SDRAM 8 again. The image data stored into the SDRAM 8 as a result of the image processing is read out by the LCD driver 10, converted to a video signal and outputted to the LCD 11. Thereby, an image corresponding to the image signal obtained by the image pickup device 4 is displayed on the LCD 11. By repeating the series of operations from exposure by the image pickup device 4 to display by the LCD 11, for example, for each frame, images are displayed on the LCD 11 in real time, that is, a live view display operation is performed. By viewing the images which are live-view displayed on the LCD 11, the user can check composition of an image to be shot.

By the release button of the operation section 15 being operated, a shooting operation is started. Then, the microcomputer 17 controls the lens driving control circuit 3 as necessary to drive the lens 1 to a focused position. Then, the microcomputer 17 determines an exposure time period, for example, according to a luminance of an object and causes the image pickup device 4 to perform an exposure operation. An image signal outputted from the image pickup device 4 after exposure ends is converted to a digital signal, and the digital signal receives image processing and is stored into the SDRAM 8 similarly to the time of the live view display operation. Image data stored into the SDRAM 8 as a result of the image processing is compressed by the JPEG processing section 12 and stored into the SDRAM 8 again. Predetermined header information is added to the image data stored into the SDRAM 8 as a result of compression processing by the microcomputer 17 so that an image file is configured thereby. The microcomputer 17 records the image file generated in this way to the recording medium 14 via the memory I/F 13.

Figure 3:
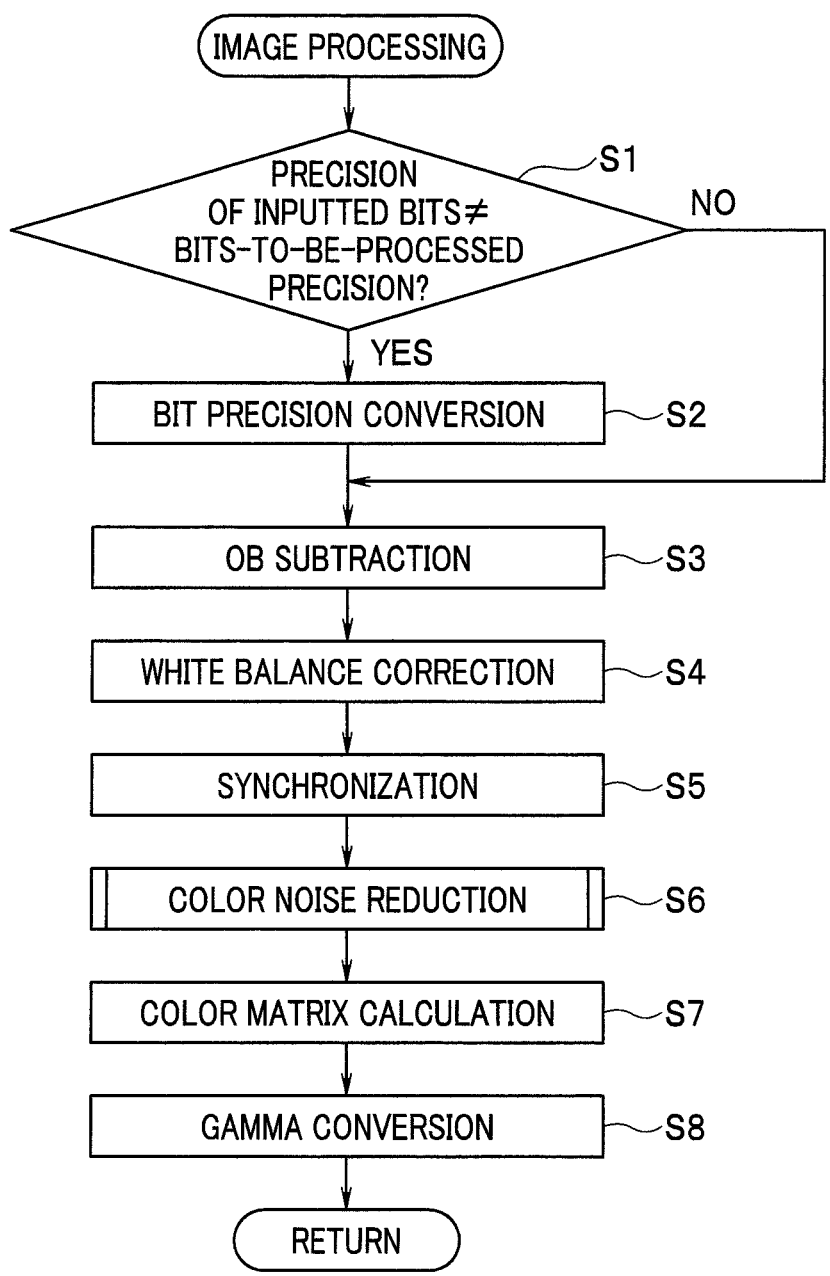
FIG. 3 is a flowchart of a subroutine showing image processing performed by the image processing section of the above first embodiment.

Next, FIG. 3 is a flowchart of a subroutine showing the image processing performed by the image processing section 9. The image processing is performed in accordance with control by the microcomputer 17 based on the image processing program read from the flash memory 16.

In this embodiment, the subroutine of the image processing shown in FIG. 3 is one of subroutines executed from a main routine not shown which is for controlling a process of the whole image pickup apparatus.

When the process is started, the bit precision converting section 21 judges whether or not bit precision of image data read from the SDRAM 8 and inputted via the bus 7 is equal to the bits-to-be-processed precision in the image processing section 9 (step S1). Disagreement between bit precisions occurs due to A/D conversion by the A/D converting section 6 in the high-speed reading mode, or the like as described above.

Here, if it is judged that the bit precisions do not correspond to each other, the bit precision converting section 21 converts the bit precision of the inputted image data to the bits-to-be-processed precision in the image processing section 9 (step S2).

When the processing of step S2 ends, or if it is judged at step S1 that the bit precisions correspond to each other, the OB subtracting section 22 subtracts an optical black component from the inputted image data (step S3).

Next, the white balance correcting section 23 performs white balance correction processing in which, for example, an R component is multiplied by a white balance gain WGr for the R component, a B component is multiplied by a white balance gain WGb for the B component, and a G component is multiplied by a white balance gain WGg for the G component (step S4). However, white balance correction is correction processing for changing a ratio among respective color components, and, therefore, for example, WGr:WGb:WGg=(WGr/WGg):(WGb/WGg):1 is satisfied, and WGg, which is difference between a left side and a right side, contributes only to gain-up of a whole image signal but does not contribute to change in white balance. Therefore, a white balance gain of any one of the color components, for example, the white balance gain WGg for the G component may be fixed to "1" (that is, the G component may not be multiplied by a white balance gain), and such a case will be mainly considered below.

Furthermore, the synchronization processing section 24 performs synchronization processing for the inputted image data and generates color image data in which all the color components are included in any pixel (step S5).

Then, the color difference calculating section 25 and the color difference correcting section 26 perform such color noise reduction processing as described later with reference to FIG. 4 (step S6).

After that, the color matrix calculating section 27 performs color matrix calculation processing for the inputted image data to convert a color space (step S7).

In addition, the gamma converting section 28 performs gamma conversion processing for the inputted image data in accordance with a gamma table read from the flash memory 16 by the microcomputer 17 (step S8).

Then, when the processing of S8 has been performed, the image data after the image processing is caused to be stored into the SDRAM 8, the image processing by the image processing section 9 ends, and the flow returns to the main routine to continue the process.

Note that an order of the image processing shown in FIGS. 2 and 3 is merely an example, and the order can be changed such as that the synchronization processing is performed before the white balance correction processing and that the color noise reduction processing is performed after the color matrix calculation processing. The color noise reduction processing of the present embodiment is, however, assumed to be performed at a stage subsequent to the white balance correction processing. Furthermore, as described above, it is preferable that the color noise reduction processing is performed at a stage prior to the gamma conversion processing which is nonlinear processing.

Figure 4:
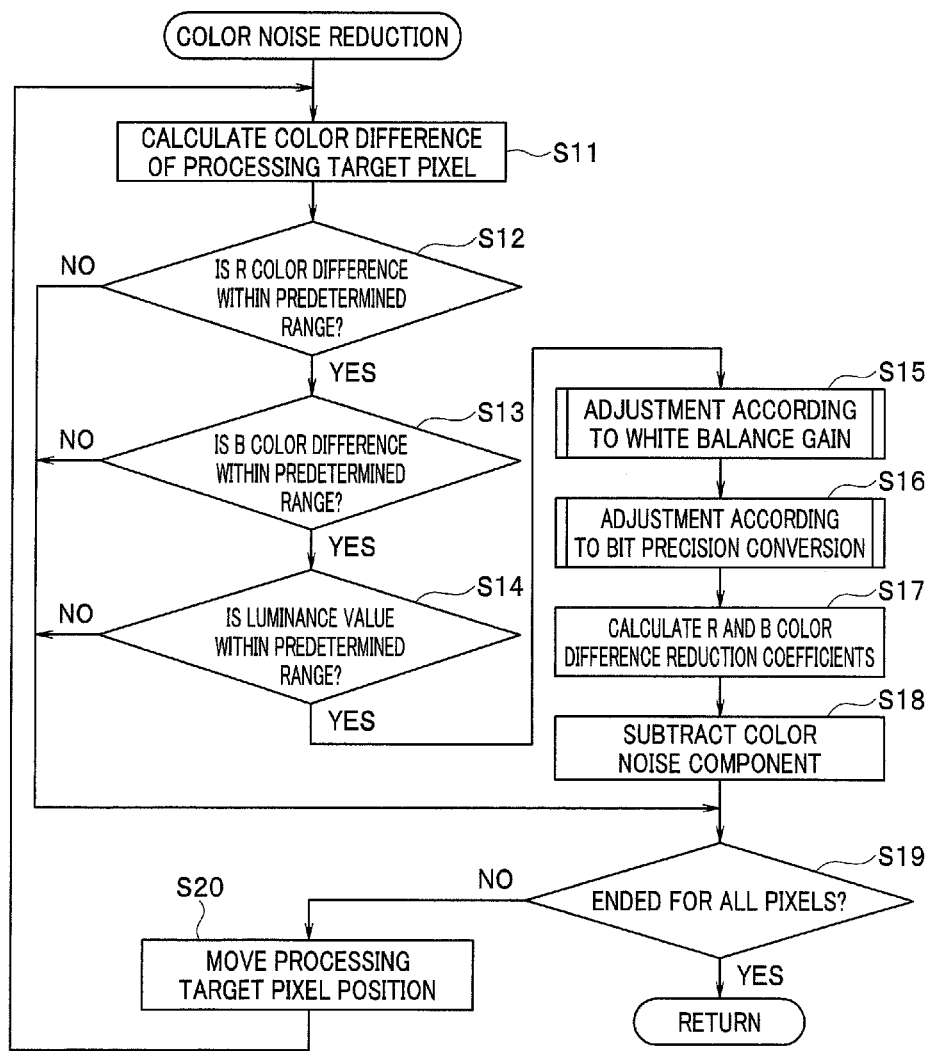
FIG. 4 is a flowchart showing details of color reduction processing at step S6 in FIG. 3 in the above first embodiment.

Next, FIG. 4 is a flowchart showing details of the color reduction processing at step S6 in FIG. 3.

When the processing is started, the color difference calculating section 25 calculates color difference of a processing target pixel (step S11).

More specifically, it is assumed that, when an i-th pixel (i is an integer of 1 or larger and N or smaller) among all of N pixels (N is a positive integer) constituting the image pickup device 4 is regarded as a processing target pixel, the processing target pixel is sequentially changed by changing i between 1 to N. At this time, if the R component, the G component and the B component of the i-th pixel in the image data after the synchronization processing are denoted by Rin(i), Gin(i) and Bin(i), respectively, the color difference calculating section 25 calculates color difference dR(i) corresponding to the R component and color difference dB(i) corresponding to the B component, for example, by following Expression 1.

$$dR(i)=Gin(i)-Rin(i)$$

$$dB(i)=Gin(i)-Bin(i) \qquad \text{[Expression 1]}$$

The color difference dR(i) and the color difference dB(i) indicate an amount of displacement from white to an R component direction (an amount of displacement in an −R component direction if signs are considered) and an amount of displacement from white to a B component direction (an amount of displacement in a −B component direction if signs are considered), respectively. In a case of white, since Gin(i)=Rin(i)=Bin(i) is satisfied, both of dR(i) and dB(i) are 0.

Note that, though differences of G from the R and B color components are regarded as color differences here to simplify calculation, the color difference is not limited thereto, and color difference in a YCbCr color space or color difference in other color spaces may be used.

Next, the color difference correcting section 26 judges whether the color difference dR(i) is within a predetermined range or not as shown by a following expression 2 (step S12).

$$-TH\_dR < dR(i) < TH\_dR$$

The threshold TH_dR for setting the predetermined range in the expression 2 corresponds to a threshold TH_dR2 to be described later with reference to FIG. 7, and the threshold TH_dR changes according to a white balance gain or a bit precision conversion ratio.

If it is judged at step S12 that the color difference dR(i) is within the predetermined range shown by the expression 2, the color difference correcting section 26 further judges whether the color difference dB(i) is within a predetermined range or not as shown by following Expression 3 (step S13)

$$-TH\_dB < dB(i) < TH\_dB \qquad \text{[Expression 3]}$$

The threshold TH_dB for setting the predetermined range in the expression 3 corresponds to a threshold TH_dB2 to be described later with reference to FIG. 8, and the threshold TH_dB changes according to a white balance gain or a bit precision conversion ratio.

In the flash memory 16, basic characteristics data of the R color difference reduction coefficient Kr and basic characteristics data of the B color difference reduction coefficient Kb set at a time of manufacture by performing actual measurement, which are to be described later, are stored in advance. The thresholds TH_dR and TH_dB for setting the predetermined ranges as shown by the expressions 2 and 3 are set by the color difference correcting section 26 on a basis of the basic characteristics data thereof read from the flash memory 16 by the microcomputer 17 in consideration of a white balance gain and a bit conversion ratio.

Here, if it is judged that the color difference dB(i) is within the predetermined range shown by the expression 3, it shows that the color displacement from white to the R component direction is within a predetermined range, and the color displacement from white to the B component direction is within a predetermined range. If both of Expressions 2 and 3 mentioned above are satisfied as described above, it is judged that the processing target pixel is color noise. On the other hand, if at least one of the expressions 2 and 3 is not satisfied, it is judged the processing target pixel is a pixel which originally has a color other than white, and the color noise reduction processing is not performed.

Thus, if the expression 3 is satisfied at step S13, it means that the processing target pixel has been judged to be a color noise pixel. However, color noise may be sometimes easily conspicuous or sometimes not easily conspicuous according to a luminance value. First, in a case of a low luminance, any color comes close to black, and a color expression range is narrow. In a case of a high luminance, any color comes close to white, and the color expression range is narrow similarly. In a case of an intermediate luminance, the color expression range is widest. To human sense of sight also, easiness to perceive color noise differs depending on luminance Therefore, the color difference correcting section 26 further judges whether or not a value of a luminance component (a luminance value) of the processing target pixel is within a predetermined luminance range where it is necessary to perform the color noise reduction processing as shown by a following expression 4 (step S14).

$$Lg \leq Gin(i) \leq Ug \qquad \text{[Expression 4]}$$

A lower-limit threshold Lg and an upper-limit threshold Ug for setting the predetermined luminance range as shown by the expression 4 are values, for example, set by performing actual measurement at a time of manufacture, stored in the flash memory 16 in advance and read by the microcomputer 17 similarly as described above.

Note that, though the G component is used as the value of the luminance component (the luminance value) here to simplify calculation, luminance in the YCbCr color space or luminance in other color spaces may be used similarly as described above.

Figure 9:
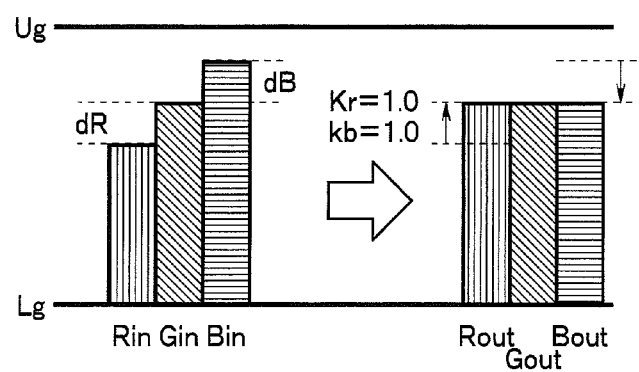
FIG. 9 is a diagram showing an example of processing of pixel data whose color difference and luminance value are within predetermined ranges, in the above first embodiment.
Figure 10:
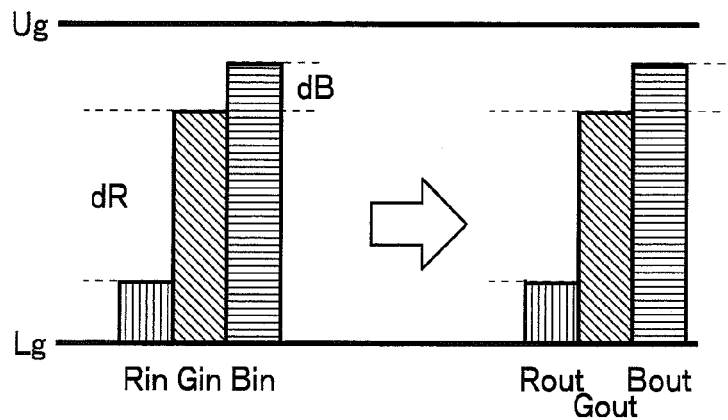
FIG. 10 is a diagram showing an example of processing of pixel data whose R color difference is outside the predetermined range in the above first embodiment.
Figure 11:
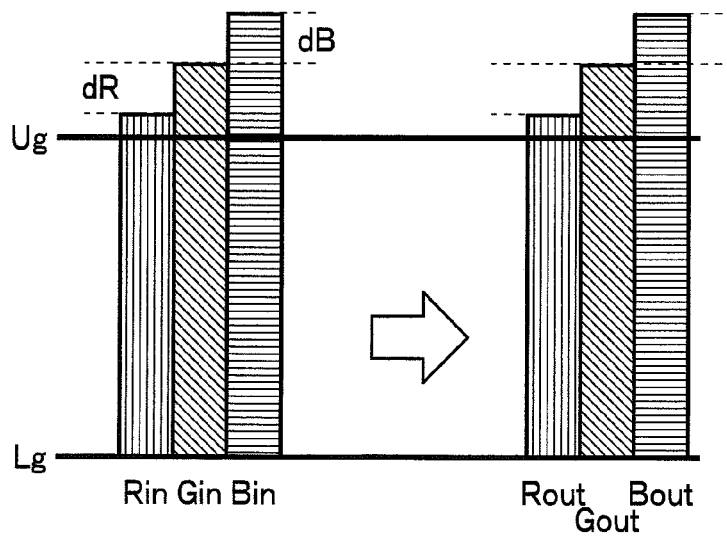
FIG. 11 is a diagram showing an example of processing of pixel data whose luminance value is outside the predetermined range in the above first embodiment.

Here, the judgments of steps S12 to S14 stated above will be described with reference FIGS. 9 to 11. FIG. 9 is a diagram showing an example of processing of pixel data whose color difference and luminance value are within the predetermined ranges. FIG. 10 is a diagram showing an example of processing of pixel data whose R color difference is outside the predetermined range. FIG. 11 is a diagram showing an example of processing of pixel data whose luminance value is outside the predetermined range.

First, the example shown in FIG. 9 is an example in which the color difference dR(i) satisfies the predetermined range shown by the expression 2, the color difference dB(i) satisfies the predetermined range shown by the expression 3, and a luminance value Gin(i) satisfies the predetermined luminance range shown by the expression 4 (that is, results of all the judgments of steps S12 to S14 are YES). In this case, color noise reduction is performed for pixel data Rin, Gin and Bin before color noise reduction processing as shown on a left side by processing of S18 to be described later, and pixel data Rout, Gout and Bout after color noise reduction processing as shown on a right side are obtained. In the example shown in FIG. 9, especially the R color difference reduction coefficient Kr=1 and the B color difference reduction coefficient Kb=1 are applied (see later description for the coefficients), and color noise has been completely removed, and the pixels have returned to an achromatic color (white).

The example shown in FIG. 10 is an example in which the color difference dB(i) satisfies the predetermined range shown by the expression 3, and the luminance value Gin(i) satisfies the predetermined luminance range shown by the expression 4, but the color difference dR(i) does not satisfy the predetermined range shown by the expression 2 (that is, the result of the judgment of step S12 is NO). In this case, processing of step S18 is skipped, that is, color noise reduction processing is not performed.

Furthermore, the example shown in FIG. 11 is an example in which the color difference dR(i) satisfies the predetermined range shown by the expression 2, and the color difference dB(i) satisfies the predetermined range shown by the expression 3, but the luminance value Gin(i) does not satisfy the predetermined luminance range shown by the expression 4 (that is, the result of the judgment of step S14 is NO). In this case also, the processing of step S18 is skipped, that is, color noise reduction processing is not performed.

Next, the color difference correcting section 26 performs adjustment according to a white balance gain for adjusting the color difference reduction coefficient K showing a degree of reduction of color difference components in color noise reduction processing, according to white balance as described later with reference to FIG. 5 (step S15).

Next, the color difference correcting section 26 performs adjustment according to bit precision conversion for adjusting the color difference reduction coefficient K described above, according to bit precision conversion as described later with reference to FIG. 6 (step S16).

Note that, though the adjustment according to a white balance gain is performed previously and the adjustment according to bit precision conversion is performed subsequently, the processing order may be reversed.

Figure 7:
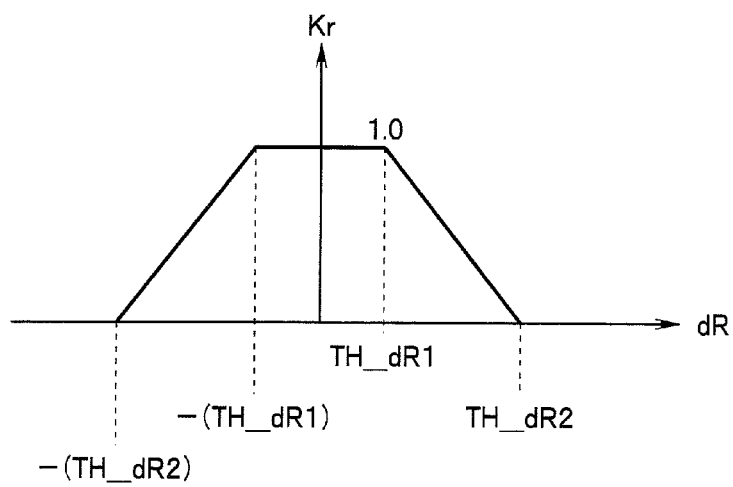
FIG. 7 is a diagram showing an example of a graph of an R color difference reduction coefficient Kr in the above first embodiment.
Figure 8:
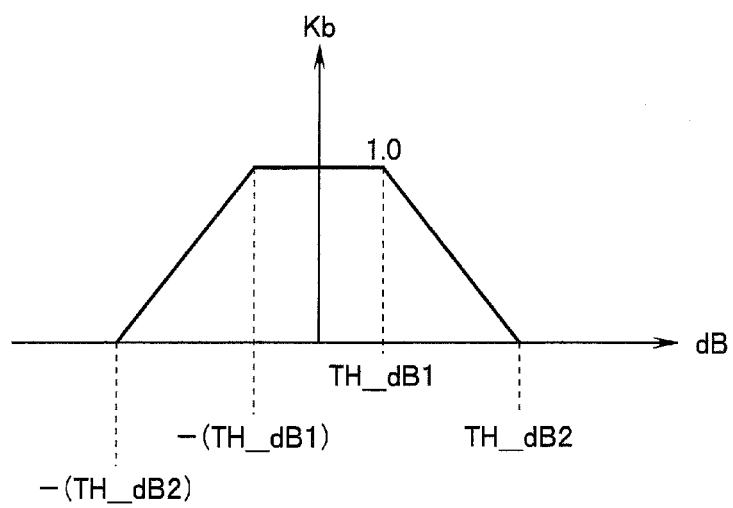
FIG. 8 is a diagram showing an example of a graph of a B color difference reduction coefficient Kb in the above first embodiment.

The R and B color difference reduction coefficients Kr and Kb adjusted by steps S15 and S16 are assumed to be, for example, as shown in FIGS. 7 and 8. Here, FIG. 7 is a diagram showing an example of a graph of the R color difference reduction coefficient Kr, and FIG. 8 is a diagram showing an example of a graph of the B color difference reduction coefficient Kb.

The R color difference reduction coefficient Kr shown in FIG. 7 shows such characteristics that Kr=1 is satisfied at a time of $|dR| \leq TH\_dR1$, Kr decreases as $|dR|$ increases at a time of $|dR| > TH\_dR1$, and Kr=0 is satisfied at a time of $|dR| > TH\_dR2$ (here, $TH\_dR1 \leq TH\_dR2$ is satisfied).

Similarly, the B color difference reduction coefficient Kb shown in FIG. 8 shows such characteristics that Kb=1 is satisfied at a time of $|dB| \leq TH\_dB1$, Kb decreases as $|dB|$ increases at a time of $|dB| > TH\_dB1$, and Kb=0 is satisfied at a time of $|dB| > TH\_dB2$ (here, $TH\_dB1 \leq TH\_dB2$ is satisfied).

The color difference correcting section 26 determines the R color difference reduction coefficient Kr to be applied to the processing target pixel from the graph of the R color difference reduction coefficient Kr shown in FIG. 7 on a basis of the color difference dR(i) of the processing target pixel, and further determines the B color difference reduction coefficient Kb to be applied to the processing target pixel from the graph of the B color difference reduction coefficient Kb shown in FIG. 8 on a basis of the color difference dB(i) of the processing target pixel (step S17).

Then, the color difference correcting section 26 performs color noise reduction processing on a basis of the determined R and B color difference reduction coefficients Kr and Kb as shown by following Expression 5 (step S18).

$$Rout(i) = Rin(i) + (Kr \times dR(i))$$

$$Bout(i) = Bin(i) + (Kb \times dB(i))$$

$$Gout(i) = Gin(i) \qquad \text{[Expression 5]}$$

As seen from Expression 5, first, the G component is not influenced by the color noise reduction processing.

By referring to the definitions of the color differences dR(i) and dB(i) shown by Expression 1 and the R and B color difference reduction coefficients Kr and Kb shown in FIGS. 7 and 8, it is known that the R component is not corrected when Kr=0 is satisfied, and the B component is not corrected when Kb=0 is satisfied. Furthermore, the R component is replaced with the G component Gin(i) at a time of Kr=1, and the B component is replaced with the G component Gin(i) at a time of Kb=1. That is, it is known that Rout(i)=Bout(i)=Gout(i) is satisfied at a time of Kr=Kb=1, and the pixel after the color noise reduction processing becomes completely white (more accurately, an achromatic color as described above). When 0<Kr<1 and 0<Kb<1 are satisfied, the inputted pixel data comes close to white according to a value of Kr and a value of Kb.

Rout(i), Bout(i) and Gout(i) calculated in this way are outputs from the color difference correcting section 26.

When the processing of step S18 has been performed, it is judged whether processing for all the N pixels has ended or not (step S19). If it is judged that there is an unprocessed pixel, a processing target pixel position is moved (step S20), and the flow returns to step S11 to perform the process as described above for a new processing target pixel.

Thus, when it is judged at step S19 that processing for all the N pixels has ended, the flow returns from the process to the process shown in FIG. 3.

Figure 5:
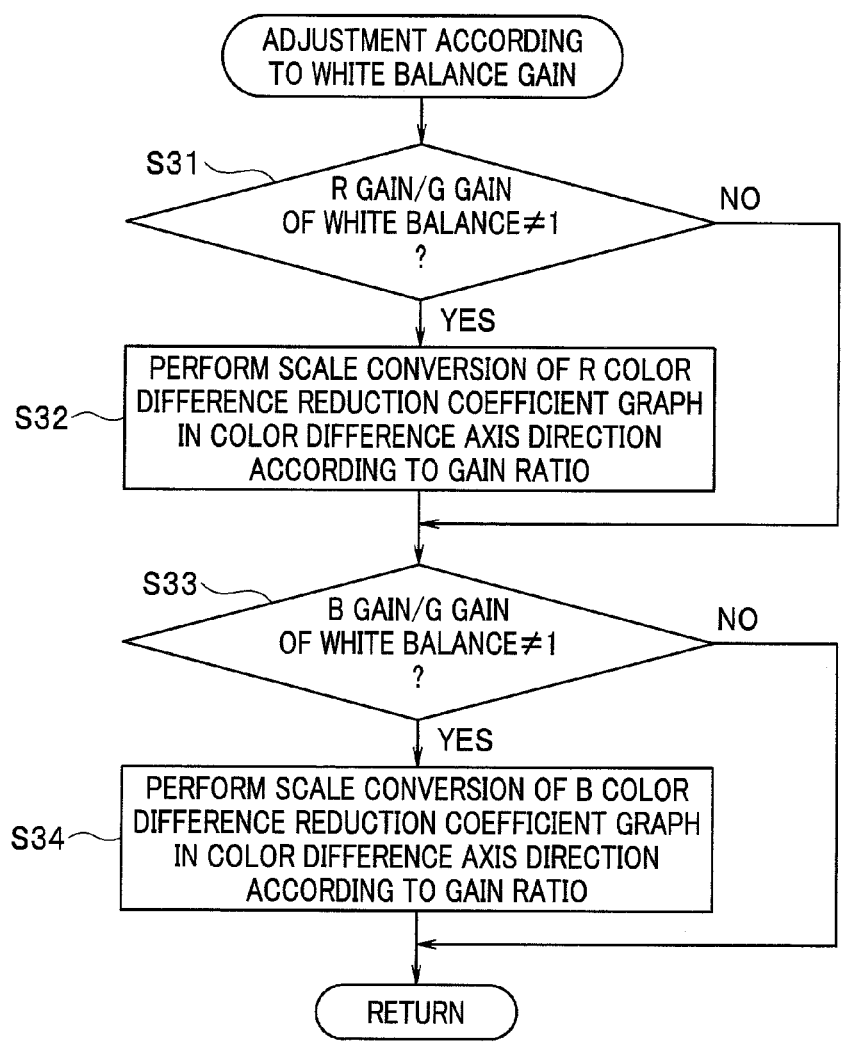
FIG. 5 is a flowchart showing details of adjustment according to a white balance gain at step S15 in FIG. 4 in the above first embodiment.

Next, FIG. 5 is a flowchart showing details of the adjustment according to a white balance gain at step S15 in FIG. 4.

When the process starts, the color difference correcting section 26 judges whether a ratio of a white balance gain WGr for the R component relative to a white balance gain WGg for the G component (WGr/WGg) in the white balance correction processing performed by the white balance correcting section 23 is "1" or not (step S31).

Figure 12:
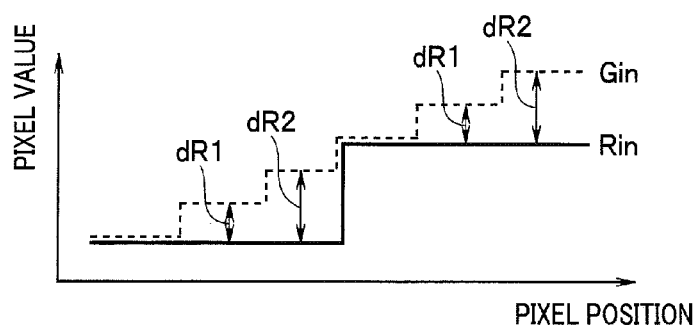
FIG. 12 is a diagram for illustrating color noise caused by a white balance gain of an R component and a white balance gain of a G component being different from each other in the above first embodiment.

Here, if it is judged that the ratio is not "1", for example, color noise as shown in FIG. 12 may occur. FIG. 12 is a diagram for illustrating the color noise caused by the white balance gain of the R component and the white balance gain of the G component being different from each other.

FIG. 12 shows an example at a time when WGg=1 and WGr=3 are satisfied. Since gain-up is not performed for the G component, a minimum unit by which a signal value changes is 1 tone, which is a quantization unit. In comparison, since the R component has been gained up to be three times, the minimum unit by which a signal value changes is three tones which is three times the quantization unit. Therefore, errors based on difference in the minimum unit of change in a signal value occurring in a pixel which should be white after white balance correction, color difference dR1 corresponding to one tone and color difference dR2 corresponding to two tones here, become color noise. Here, the maximum number of tones to which color difference occurring as color noise corresponds differs according to a gain value of the R component (more generally, (WGr/WGg)).

Figure 16:
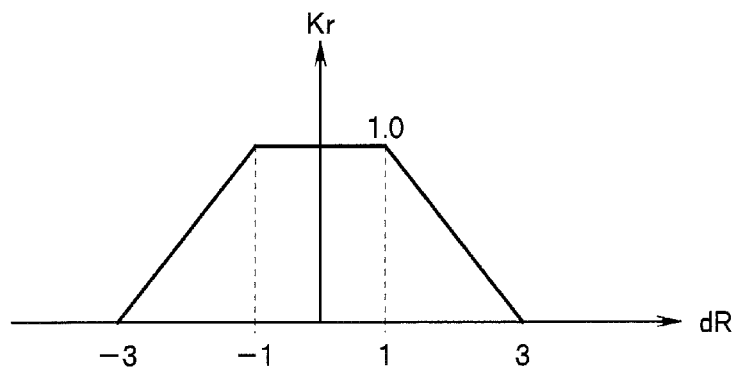
FIG. 16 is a diagram showing an example of basic characteristics of the R color difference reduction coefficient Kr relative to color difference dR in the above first embodiment.

Therefore, if it is judged at step S31 that the ratio is not "1", the color difference correcting section 26 performs correction in which scale conversion of a graph of the R color difference reduction coefficient Kr, for example, as shown in FIG. 16, which is the basic characteristics data of the R color difference reduction coefficient Kr read from the flash memory 16 via the microcomputer 17, is performed in a color difference axis direction by a magnification corresponding to the ratio (WGr/WGg) (step S32).

Here, FIG. 16 is a diagram showing an example of the basic characteristics of the R color difference reduction coefficient Kr relative to color difference dR. The example shown in FIG. 16 is an example in which a graph of the R color difference reduction coefficient Kr at a time when WGr=2 and WGg=1 are satisfied and bit precision of an inputted image corresponds to the bits-to-be-processed precision is shown as the basic characteristic. More specifically, the R color difference reduction coefficient Kr shown in FIG. 16 shows such characteristics that Kr=1 is satisfied at a time of |dR|≤TH_dR1, Kr decreases as |dR| increases at a time of |dR|>TH_dR1, and Kr=0 is satisfied at a time of |dR|>3.

At this time, similarly to a case of a color difference dB to be described below with reference to FIG. 14, the errors based on difference in the minimum unit of change in a signal value occurring in a pixel which should be white after white balance correction is the color difference dR1 corresponding to one tone (the color difference dR2 corresponding to two tones as in the case of WGr=3 does not occur). Referring to FIG. 16, the R color difference reduction coefficient Kr corresponding to the color difference dR1 is 1.0. By applying Kr=1.0 to a first equation in Expression 5, Rout(i)=Gin(i) is obtained, and it is known that color noise for the R component is completely removed. It is for a purpose of causing color difference to gradually change toward a surround area, avoiding abrupt change from being caused depending on whether color noise correction is performed or not, to reduce an uncomfortable feeling from color difference change, that Kr decreases as |dR| increases from 1 to 3.

In a case of adopting the basic characteristics shown in FIG. 16, the scale conversion of step S32 is performed by expanding the graph of the R color difference reduction coefficient Kr in the color difference axis direction, for example, {(WGr/WGg)−1} times. Especially, when WGg=1 is set, the graph of the R color difference reduction coefficient Kr is expanded in the color difference axis direction (WGr−1) times.

However, color difference in a digital image takes only an integer value, and, therefore, more accurately speaking, the scale conversion of step S32 is performed incrementally. For example, the scale conversion is not performed at a time of 1<WGr≤2 (that is, the graph of the R color difference reduction coefficient Kr at a time of WGr=2 is immediately used); the graph of the R color difference reduction coefficient Kr at the time of WGr=2 is expanded twice in the color difference axis direction when 2<WGr≤3 is satisfied; the graph of the R color difference reduction coefficient Kr at the time of WGr=2 is expanded three times in the color difference axis direction when 3<WGr≤4 is satisfied; . . . , the graph of the R color difference reduction coefficient Kr at the time of WGr=2 is expanded n times in the color difference axis direction when n<WGr≤(n+1) is satisfied where n is a positive integer, and so on.

Figure 18:
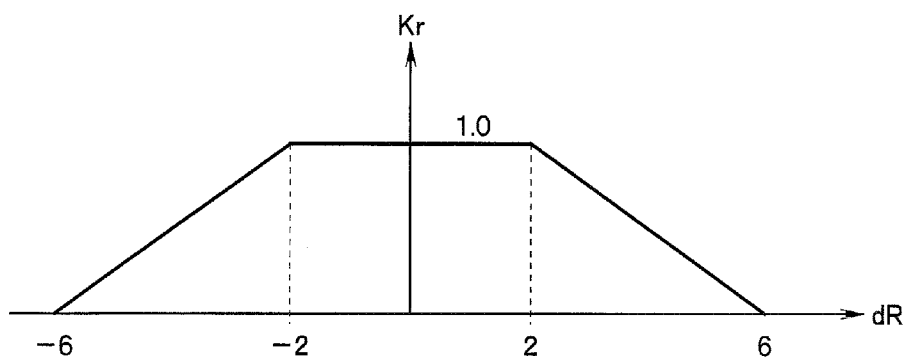
FIG. 18 is a diagram showing an example of the characteristics of the R color difference reduction coefficient Kr corrected according to the white balance gain in the above first embodiment.

More specifically, in the case shown in FIG. 12, since WGr=3 is satisfied, the graph of the R color difference reduction coefficient Kr shown in FIG. 16 is expanded twice in the color difference axis direction by the scale conversion of step S32, and a graph of the R color difference reduction coefficient Kr as shown in FIG. 18 is generated. Here, FIG. 18 is a diagram showing an example of the characteristics of the R color difference reduction coefficient Kr corrected according to a white balance gain.

Figure 13:
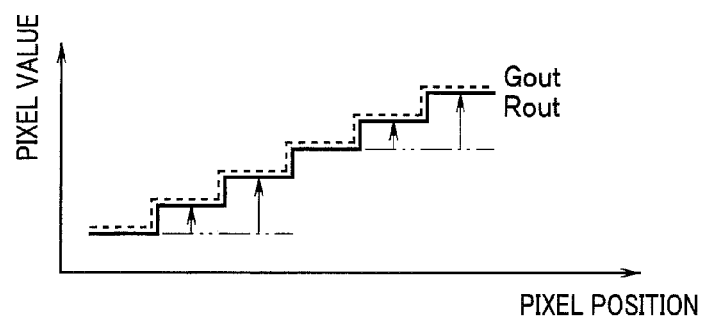
FIG. 13 is a diagram showing a state in which the color noise shown in FIG. 12 has been removed in the above first embodiment.

As described above, the color noise which may occur at the time of WGr=3 is the color difference dR1 corresponding to one tone or the color difference dR2 corresponding to two tones. Referring to FIG. 18, the R color difference reduction coefficient Kr is 1.0 in both of the cases, and it is known that Rout(i)=Gin(i) is satisfied, and the color differences dR1 and dR2, which are color noise for the R component, are completely removed as shown in FIG. 13. Here, FIG. 13 is a diagram showing a state in which the color noise shown in FIG. 12 has been removed. In the graph in FIG. 18, Kr decreases as |dR| increases from 2 to 6 to reduce the uncomfortable feeling caused by abrupt change in color difference, similarly as described above.

If the processing of step S32 is performed, or if the ratio is judged to be "1" at step S31, the color difference correcting section 26 judges whether a ratio of a white balance gain WGb for the B component relative to the white balance gain WGg for the G component (WGb/WGg) in the white balance correction processing performed by the white balance correcting section 23 is "1" or not (step S33).

Figure 14:
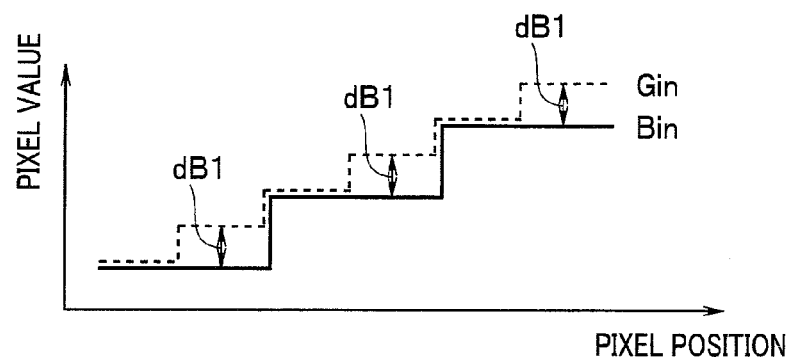
FIG. 14 is a diagram for illustrating color noise caused by a white balance gain of a B component and a white balance gain of the G component being different from each other in the above first embodiment.

Here, if it is judged that the ratio is not "1", for example, the color noise as shown in FIG. 14 may occur similarly as described above. FIG. 14 is a diagram for illustrating color noise caused by the white balance gain of the B component and the white balance gain of the G component being different from each other.

FIG. 14 shows an example at a time when WGg=1 and WGb=2 are satisfied. The minimum unit by which a signal value of the G component is one tone, while the minimum unit by which a signal value of the R component is two tones because the R component has been gained up to be twice. Therefore, color difference dB1 corresponding to one tone occurring in a pixel which should be white after white balance correction becomes color noise. Similarly as described above, the maximum number of tones to which color difference occurring as color noise corresponds differs according to a gain value of the B component (more generally, (WGb/WGg)).

Figure 17:
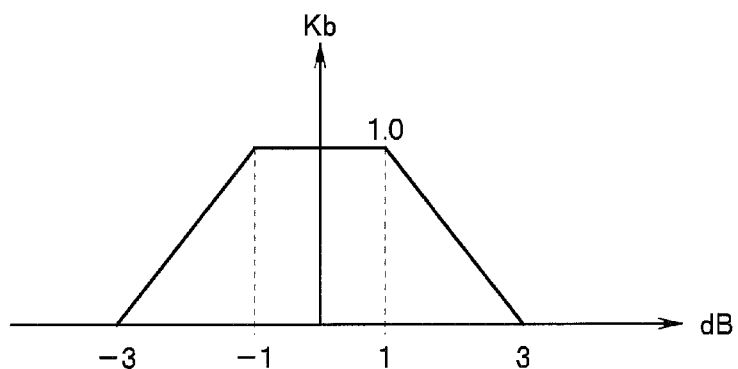
FIG. 17 is a diagram showing an example of basic characteristics of the B color difference reduction coefficient Kb relative to color difference dB in the above first embodiment.

Therefore, if it is judged at step S33 that the ratio is not "1", the color difference correcting section 26 performs correction in which scale conversion of a graph of the B color difference reduction coefficient Kb, for example, as shown in FIG. 17, which is the basic characteristics data of the B color difference reduction coefficient Kb read from the flash memory 16 via the microcomputer 17, is performed in the color difference axis direction by a magnification corresponding to the ratio (WGb/WGg) (step S34).

Here, FIG. 17 is a diagram showing an example of the basic characteristics of the B color difference reduction coefficient Kb relative to color difference dB The example shown in FIG. 17 is an example in which a graph of the B color difference reduction coefficient Kb at a time when WGb=2 and WGg=1 are satisfied and bit precision of an inputted image corresponds to the bits-to-be-processed precision is shown as the basic characteristic. More specifically, the B color difference reduction coefficient Kb shown in FIG. 17 shows such characteristics that Kb=1 is satisfied at a time of |dB|≤1, Kb decreases as |dB| increases at a time of |dB|>1, and Kb=0 is satisfied at a time of |dB|>3.

Figure 15:
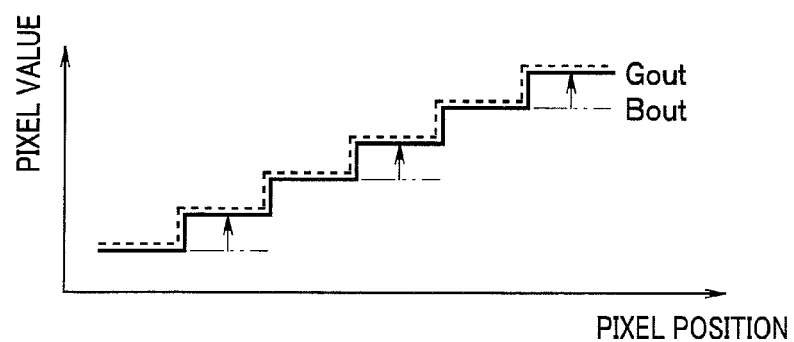
FIG. 15 is a diagram showing a state in which the color noise shown in FIG. 14 has been removed in the above first embodiment.

At this time, similarly to the example described with reference to FIG. 16, the B color difference reduction coefficient Kb corresponding to the color difference dB1 corresponding to the B color difference reduction coefficient Kb1=1.0 is applied to a second equation in Expression 5, and it is known that Bout(i)=Gin(i) is satisfied, and the color difference dB1, which is color noise for the B component, is completely removed as shown in FIG. 15. Here, FIG. 15 is a diagram showing a state in which the color noise shown in FIG. 14 has been removed. In the graph in FIG. 17, Kb decreases as |dB| increases from 1 to 3 to reduce the uncomfortable feeling caused by abrupt change in color difference similarly as described above.

In a case of adopting the basic characteristics shown in FIG. 17, the scale conversion of step S34 is performed by expanding the graph of the B color difference reduction coefficient Kb in the color difference axis direction, for example, {(WGb/WGg)−1} times. Especially, when WGg=1 is set, the graph of the B color difference reduction coefficient Kb is expanded in the color difference axis direction (WGb−1) times.

The scale conversion of step S34 is incrementally performed similarly as described above. For example, the scale conversion is not performed at a time of 1<WGb≤2 (that is, the graph of the B color difference reduction coefficient Kb at a time of WGb=2 is immediately used); the graph of the B color difference reduction coefficient Kb at the time of WGb=2 is expanded twice in the color difference axis direction when 2<WGb≤3 is satisfied; the graph of the B color difference reduction coefficient Kb at the time of WGb=2 is expanded three times in the color difference axis direction when 3<WGb≥4 is satisfied; . . . ; the graph of the B color difference reduction coefficient Kb at the time of WGb=2 is expanded n times in the color difference axis direction when n<WGb≤(n+1) is satisfied where n is a positive integer, and so on.

Thus, the color difference correcting section 26 which performs the processing of step S32 or step S34 functions as a color difference correction range setting section which sets a color difference correction range so that the color difference correction range is wider as a white balance gain is larger and is narrower as the white balance gain is smaller.

If the processing of step S34 is performed, or if the ratio is judged to be "1" at step S33, the flow returns from the process to the process shown in FIG. 4.

Figure 6:
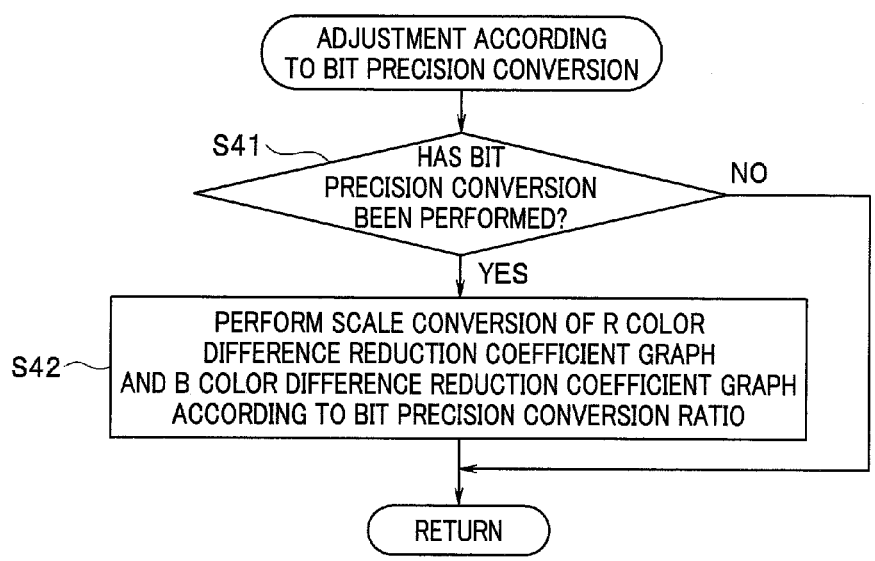
FIG. 6 is a flowchart showing details of adjustment according to bit precision conversion at step S16 in FIG. 4 in the above first embodiment.

Next, FIG. 6 is a flowchart showing details of the adjustment according to bit precision conversion at step S16 in FIG. 4.

When the process starts, the color difference correcting section 26 judges whether or not bit precision conversion has been performed by the bit precision converting section 21 (step S41).

Figure 19:
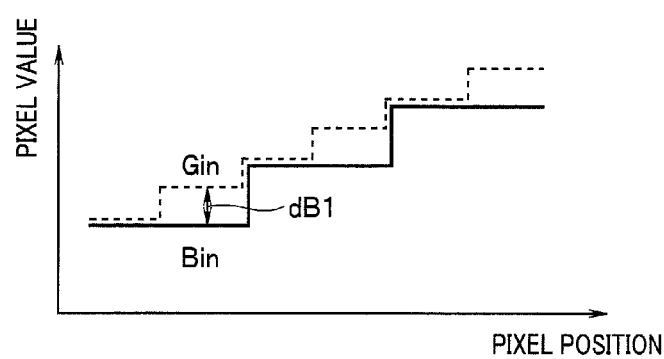
FIG. 19 is a diagram showing an example in which color noise of color difference dB1 corresponding to one tone occurs due to white balance correction in the above first embodiment.
Figure 20:
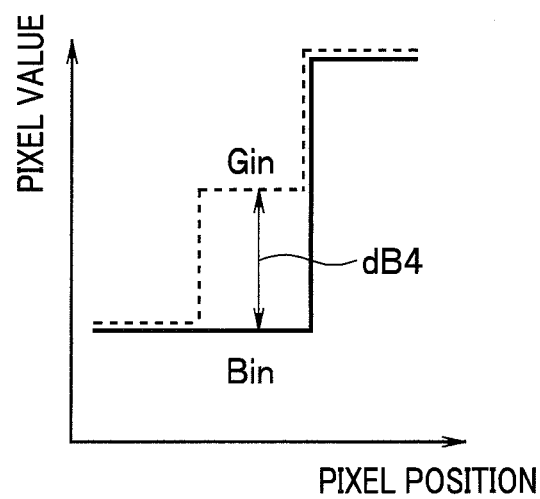
FIG. 20 is a diagram showing a state in which the color noise shown in FIG. 19 has been expanded by bit precision conversion of two bits in the above first embodiment.

For example, it is assumed that color noise of the color difference dB1 corresponding to one tone as shown in FIG. 19 occurs due to the white balance correction. FIG. 19 is a diagram showing an example in which the color noise of the color difference dB1 corresponding to one tone occurs due to the white balance correction. It is assumed that the bit precision conversion by the bit precision converting section 21 is, for example, conversion from 8 bits to 10 bits, that is, conversion corresponding to four-fold gain, as described above. In this case, the color noise of the color difference dB1 corresponding to one tone as shown in FIG. 19 is expanded to color noise of color difference dB4 corresponding to four tones as shown in FIG. 20. Here, FIG. 20 is a diagram showing a state in which the color noise shown in FIG. 19 has been expanded by bit precision conversion of two bits. Thus, when bit precision conversion is performed, a process as shown below is performed.

That is, if it is judged that bit precision conversion has been performed, correction is performed in which scale conversion of the graph of the R color difference reduction coefficient Kr and the graph of the B color difference reduction coefficient Kb, for which the adjustment according to a white balance gain at step S15 has been performed, in the color difference axis direction is performed according to a bit precision conversion ratio (step S42) More specifically, processing for expanding the graph of the R color difference reduction coefficient Kr and the graph of the B color difference reduction coefficient Kb (Bpro/B0) times in the color difference axis direction is performed, where B0 denotes bit precision of inputted image data and Bpro denotes the bits-to-be-processed precision.

Figure 21:
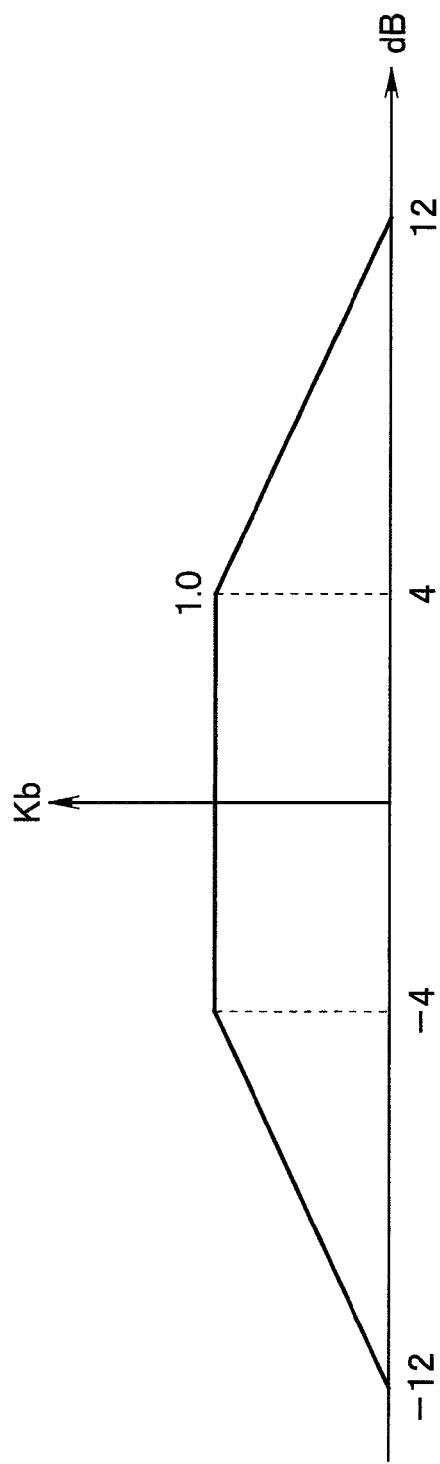
FIG. 21 is a diagram showing an example of the characteristics of the B color difference reduction coefficient Kb corrected according to the bit precision conversion in the above first embodiment.

In the example shown in FIG. 19, since dB1 has occurred, the graph of the B color difference reduction coefficient Kb as shown in FIG. 17 is immediately used even if the adjustment according to a white balance gain at step S15 is performed. Therefore, at step S42, scale conversion for expanding the graph of the B color difference reduction coefficient Kb as shown in FIG. 17 four times in the color difference axis direction to create a graph as shown in FIG. 21. FIG. 21 is a diagram showing an example of the characteristics of the B color difference reduction coefficient Kb corrected according to the bit precision conversion.

In this way, the color difference correcting section 26 functioning as the color difference correction range setting section sets the color difference correction range wide according to an expansion ratio of bit precision.

Note that, though a case where the bit precision conversion by the bit precision converting section 21 is expansion of precision has been described above, the technique described above can be similarly applied to a case of reduction of precision. Therefore, the color difference correcting section 26 sets the color difference correction range wide according to an expansion ratio if the bit precision conversion by the bit precision converting section 21 is expansion of precision, and sets the color difference correction range narrow according to a reduction ratio if the bit precision conversion is reduction of precision If the processing of step S42 is performed, or if it is judged at step S41 that bit precision conversion has not been performed, the flow returns from the process to the process shown in FIG. 4.

By the adjustment according to a white balance gain at step S15 and the adjustment according to bit precision conversion of step S16 as described above, the R color difference reduction coefficient Kr as shown in FIG. 16 and the B color difference reduction coefficient Kb as shown in FIG. 17 are adjusted as shown below.

When the R color difference reduction coefficient Kr and the B color difference reduction coefficient Kb are collectively denoted by a color difference reduction coefficient K, a white balance gain for the R component or the B component at a time of WGg=1 is collectively denoted by WG, and the graph of the color difference reduction coefficient K at a time when the bit precision conversion as shown in FIGS. 16 and 17 is not performed, and WGg=1, WGr=2 and WGb=2 are satisfied is denoted by K2, a corrected color difference reduction coefficient Kcor after the processing of steps S15 and S16 is shown by following Expression 6 with use of a ceiling function ceilings.

$$Kcor=\{ceiling(WG)-1\} \times (Bpro/B0) \times K2 \quad \text{[Expression 6]}$$

Here, as described above, B0 and Bpro denote bit precision of inputted image data and the bits-to-be-processed precision, respectively.

Therefore, a basic color difference correction range Width (K2), which is a range where color difference correction is to be performed on a basis of the color difference reduction coefficient graph K2 to be based on, becomes a color difference correction range Width(Kcor) as shown by following Expression 7, after the processing of steps S15 and S16.

$$Width(Kcor)=\{ceiling(WG)-1\} \times (Bpro/B0) \times Width(K2) \quad \text{[Expression 7]}$$

Note that, more specifically, −(TH_dR2) to TH_dR2 shown in FIG. 7 and −(TH_dB2) to TH_dB2 shown in FIG. 8 correspond to the color difference correction range Width (Kcor) after the processing.

Since noise due to a white balance gain occurs in the G component also when WGg=1 is not satisfied, it is difficult to generalize the corrected color difference reduction coefficient Kcor to accurately express a corrected color difference reduction coefficient KRcor for the R component and a corrected color difference reduction coefficient KBcor for the B component. Approximately, however, KRcor and KBcor are as shown by following Expression 8 similar to Expression 6.

$$KRcor=\{ceiling(WGr/WGg)-1\} \times (Bpro/B0) \times K2$$

$$KBcor=\{ceiling(WGb/WGg)-1\} \times (Bpro/B0) \times K2 \quad \text{[Expression 8]}$$

Note that, though it is assumed in the above description that one color difference reduction coefficient graph K2 is prepared for each of R color difference and B color difference, it is not limited to this, and a plurality of color difference reduction coefficient graphs K2 may be prepared for each according to a luminance value of a processing target pixel.

Figure 22:
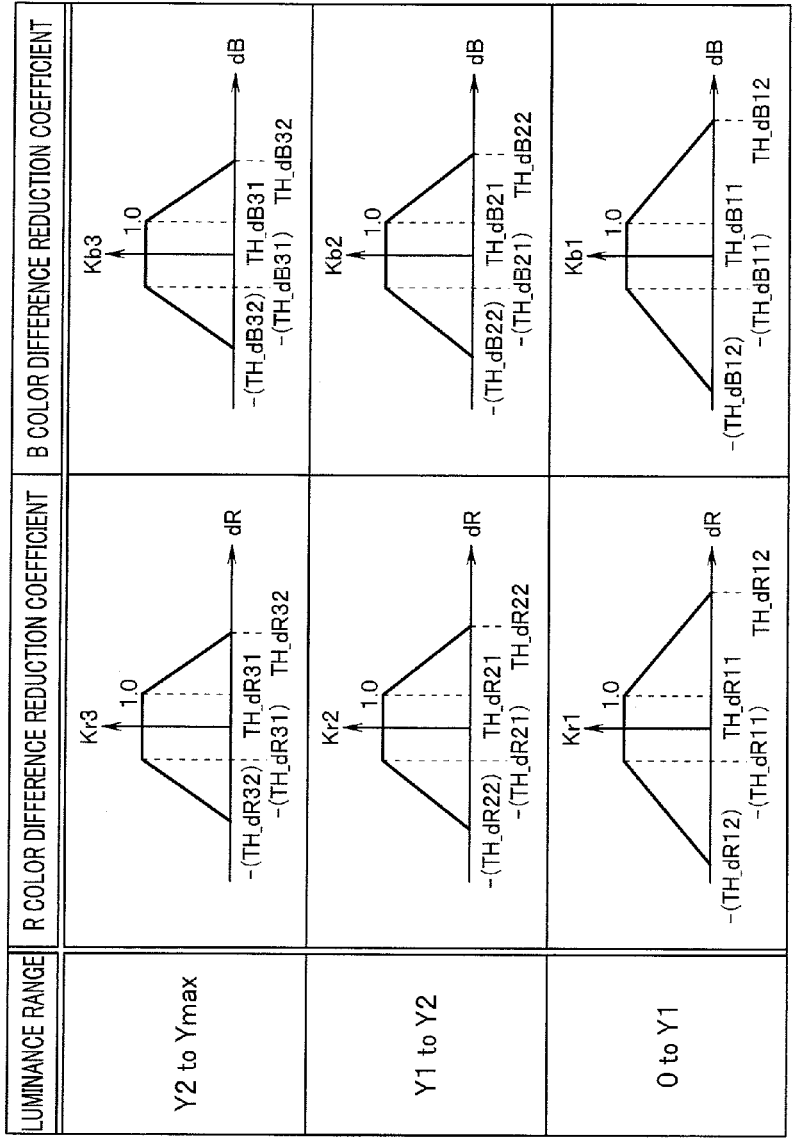
FIG. 22 is a diagram showing an example in which a luminance range is divided into three, and R and B color difference reduction coefficients are prepared for the three in the above first embodiment.

FIG. 22 is a diagram showing an example in which a luminance range is divided into three, and the R and B color difference reduction coefficients are prepared for the three.

In the example shown in FIG. 22, when the whole luminance range is assumed to be 0 to Ymax, a first predetermined luminance range, a second predetermined luminance range and a third predetermined luminance range are set to be 0 to Y1, Y1 to Y2, and Y2 to Ymax, respectively, with use of such luminance values Y1 and Y2 that 0<Y1<Y2<Ymax is satisfied. That is, the plurality of predetermined luminance ranges are set within the whole luminance range 0 to Ymax such that the luminance ranges do not overlap with one another.

A color difference reduction coefficient which gives a color difference correction range is specified for each of the first to third predetermined luminance ranges in advance. An R color difference reduction coefficient Kr1 and a B color difference reduction coefficient Kb1, an R color difference reduction coefficient Kr2 and a B color difference reduction coefficient Kb2, and an R color difference reduction coefficient Kr3 and a B color difference reduction coefficient Kb3 are specified for the first predetermined luminance range 0 to Y1, the second predetermined luminance range Y1 to Y2 and the third predetermined luminance range Y2 to Ymax, respectively.

More specifically, an R color difference reduction coefficient Krj (j=1, 2, 3) shows such characteristics that Krj=1 is satisfied at a time of |dR|≤TH_dRj1, Krj decreases as |dR| increases at a time of |dR|>TH_dBj1, and Krj=0 is satisfied at a time of |dR|>TH_dRj2 (here, TH_dRj1≤TH_dRj2 is satisfied).

Similarly, a B color difference reduction coefficient Kbj (j=1, 2, 3) shows such characteristics that Kbj=1 is satisfied at a time of |dB|TH_dBj1, Kbj decreases as |dB| increases at a time of |dB|>TH_dBj1, and Kbj=0 is satisfied at a time of |dB|>TH_dBj2 (here, TH_dBj1≤TH_dBj2 is satisfied).

In the example shown in FIG. 22, in consideration that color noise is easily conspicuous in a low-luminance area, the color difference reduction coefficients are set such that the color difference correction range is wider in a luminance range with a lower luminance value (that is, such that TH_dR11≥TH_dR21≥TH_dR31, TH_dR12≥TH_dR22≥TH_dR32, TH_dB11≥TH_dB21TH_dB31, and TH_dB12≥TH_dB22≥TH_dB32 are satisfied) More specifically, in the example shown in FIG. 22, the color difference reduction coefficients are set such that TH_dR12>TH_dR22>TH_dR32 and TH_dB12>TH_dB22>TH_dB32 are satisfied.

If a value of a luminance component (a luminance value) of a processing target pixel is included in any of the first to third predetermined luminance ranges, the color difference correcting section 26 as the color difference correction range setting section sets a color difference correction range of the luminance range in which the luminance value of the processing target pixel is included.

Therefore, if the luminance value of the processing target pixel is within the first predetermined luminance range 0 to Y1, the R color difference reduction coefficient Kr1 and the B color difference reduction coefficient Kb1 are used. If the luminance value of the processing target pixel is within the second predetermined luminance range Y1 to Y2, the R color difference reduction coefficient Kr2 and the B color difference reduction coefficient Kb2 are used. If the luminance value of the processing target pixel is within the third predetermined luminance range Y2 to Ymax, the R color difference reduction coefficient Kr3 and the B color difference reduction coefficient Kb3 are used.

According to the first embodiment as described above, a color difference correction range where color difference correction processing for reducing color difference components is to be performed is set wider as a white balance gain is larger and set narrow as the white balance gain is smaller. Therefore, even if the white balance gain differs for each color component, it is possible to appropriately reduce coloring of an achromatic color image part.

Furthermore, since the color difference correction range is set wide or narrow depending on an expansion ratio or a reduction ratio in conversion of bit precision, it is possible to appropriately reduce coloring of an achromatic color image part even if bit precision conversion is performed.

More specifically, by setting the color difference correction range to be (Bpro/B0) times, reduction of color noise can be optimized.

By setting the color difference correction range for the R component to a magnification ratio corresponding to the ratio (WGr/WGg) and setting the color difference correction range for the B component to a magnification ratio corresponding to the ratio (WGb/WGg), each of reduction of R color difference and reduction of B color difference can be performed appropriately.

By performing color difference correction processing when a luminance value of a processing target pixel is within a predetermined luminance range, it is possible to omit correction of luminance ranges where color noise is not conspicuous to reduce a processing load.

In addition, by specifying a color difference correction range for each of a plurality of the luminance ranges, it becomes possible to perform appropriate color noise reduction according to a luminance value of a processing target pixel.

Furthermore, by performing color difference correction processing at a stage prior to any nonlinear image processing, it is possible to avoid complication of the color difference correction processing.

Note that, though description has been made above mainly on an image processing device, an image processing method for performing processing similar to that of the image processing device as described above is also possible, and an image processing program for causing a computer to implement the image processing method, a non-transitory computer-readable recording medium for recording the image processing program and the like are also possible.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing device comprising:
   a white balance correcting section multiplying each color component of image data by a white balance gain for the color component to perform white balance correction;
   a color difference calculating section calculating color difference components of the image data after the white balance correction, for each pixel;
   a color difference correcting section performing color difference correction processing for reducing the color difference components for a processing target pixel when all the color difference components of the processing target pixel are within a predetermined color difference correction range;
   a color difference correction range setting section setting the color difference correction range wider as the white balance gain is larger and narrower as the white balance gain is smaller; and
   a bit precision converting section converting bit precision of the image data to bits-to-be-processed precision of the color difference correcting section at a stage preceding the color difference correcting section.

2. The image processing device according to claim 1, wherein
   the color difference correction range setting section further sets the color difference correction range wide according to an expansion ratio if bit precision conversion by the bit precision converting section is precision expansion and sets the color difference correction range narrow according to a reduction ratio if the bit precision conversion is precision reduction.

3. The image processing device according to claim 2, wherein the color difference correction range setting section sets the color difference correction range to (Bpro/B0) times, where B0 denotes the bit precision of the image data and Bpro denotes the bits-to-be-processed precision of the color difference correcting section.

4. The image processing device according to claim 3, wherein
   the white balance correcting section multiplies RGB components of the image data by white balance gains WGr, WGg and WGb for the RGB components, respectively, to perform white balance correction; and
   the color difference correction range setting section sets a color difference correction range for the R component to a magnification ratio corresponding to a ratio of (WGr/WGg) and sets a color difference correction range for the B component to a magnification ratio corresponding to a ratio of (WGb/WGg).

5. The image processing device according to claim 1, wherein the color difference correcting section performs the color difference correction processing if a value of a luminance component of the processing target pixel is within a predetermined luminance range.

6. The image processing device according to claim 5, wherein the predetermined luminance range is set in plurality in a manner that the predetermined luminance ranges do not overlap with one another;

the color difference correction range is specified for each of the plural predetermined luminance ranges in advance; and if the value of the luminance component of the processing target pixel is included in any one of the plural predetermined luminance ranges, the color difference correction range setting section sets the color difference correction range for the luminance range in which the value of the luminance component of the processing target pixel is included.

7. The image processing device according to claim 1, wherein the color difference correction processing by the color difference correcting section is performed at a stage prior to any nonlinear image processing performed for the image data.

8. An image processing method comprising:

a white balance correcting step of multiplying each color component of image data by a white balance gain for the color component to perform white balance correction;

a bit precision converting step of converting bit precision of the image data after the white balance correcting step to bits-to-be-processed precision of a color difference correcting step;

the color difference calculating step of calculating color difference components of the image data, for each pixel;

a color difference correction step of performing color difference correction processing for reducing the color difference components for a processing target pixel when all the color difference components of the processing target pixel are within a predetermined color difference correction range; and a color difference correction range setting step of setting the color difference correction range wider as the white balance gain is larger and narrower as the white balance gain is smaller.

9. A non-transitory computer-readable recording medium recording an image processing program, the image processing program including:

a white balance correcting step of multiplying each color component of image data by a white balance gain for the color component to perform white balance correction;

a bit precision converting step of converting bit precision of the image data after the white balance correcting step to bits-to-be-processed precision of a color difference correcting step;

the color difference calculating step of calculating color difference components of the image data, for each pixel;

a color difference correction step of performing color difference correction processing for reducing the color difference components for a processing target pixel when all the color difference components of the processing target pixel are within a predetermined color difference correction range; and a color difference correction range setting step of setting the color difference correction range wider as the white balance gain is larger and narrower as the white balance gain is smaller.

* * * * *